Jan. 20, 1970     L. M. O. CYMBALISTY     3,490,589
CONTROLLED PHASE SEPARATION VESSEL
Filed June 17, 1968
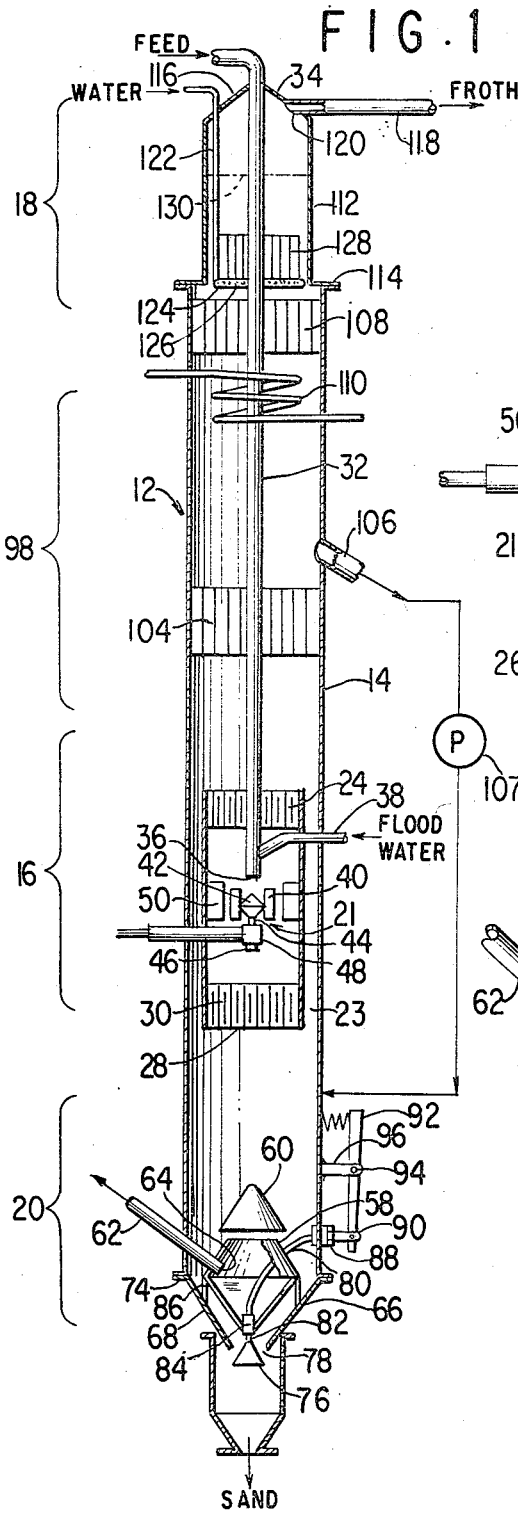
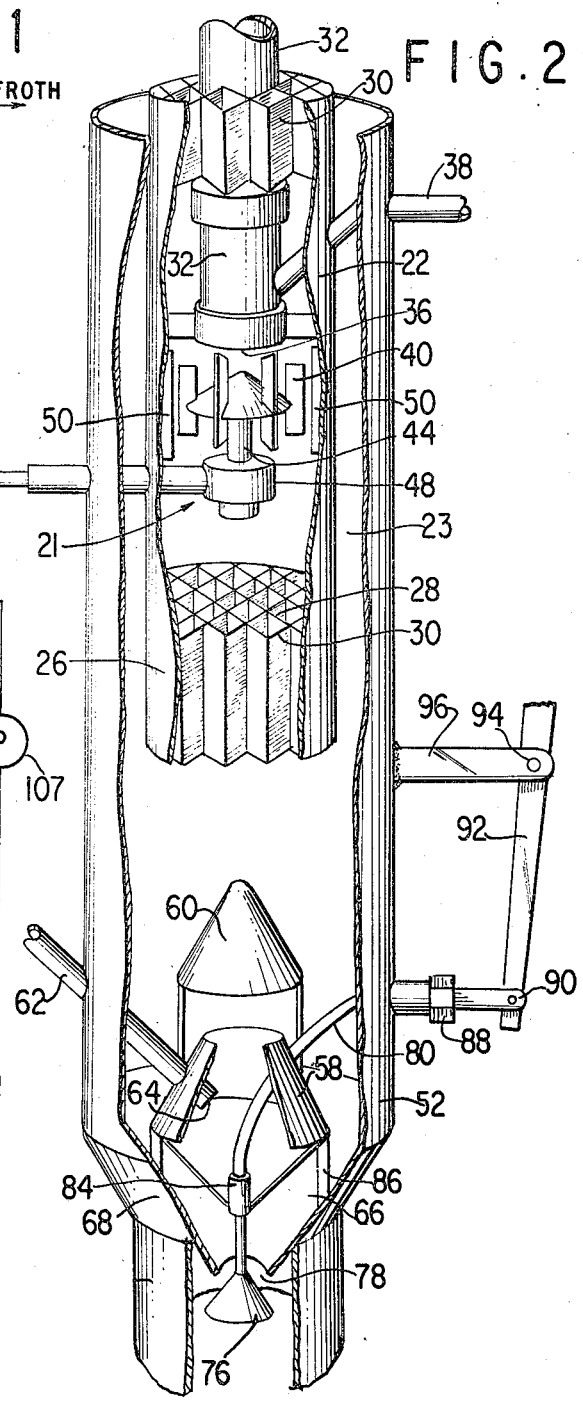
INVENTOR
LUBOMYR M.O. CYMBALISTY
BY
ATTORNEY

United States Patent Office 3,490,589
Patented Jan. 20, 1970

3,490,589
CONTROLLED PHASE SEPARATION VESSEL
Lubomyr M. O. Cymbalisty, Edmonton, Alberta, Canada, assignor of thirty percent each to Cities Service Athabasca, Inc., a corporation of Delaware, Imperial Oil Limited, a Canadian corporation, Atlantic Richfield Corporation, a corporation of Pennsylvania, and ten percent to Royalite Oil Company, Limited, a Canadian corporation
Filed June 17, 1968, Ser. No. 737,426
Int. Cl. B03d 1/18
U.S. Cl. 209—163                                8 Claims

ABSTRACT OF THE DISCLOSURE

A controlled phase separation vessel for use in separating hydrocarbon material such as bitumen from a slurry of water, bitumen and sand is shown herein. The separation vessel is a vertically mounted elongated shell functionally divided into three zones, a froth separation zone at the top of the vessel, a mixing zone in the middle of the vessel, and a sand settling zone at the bottom of the vessel. The mixing zone comprises a flood cell in the form of a open ended vertical cylinder mounted at a distance from the inside walls of the shell so as to form an annular bypass, and having turbulence reducing baffles located at both ends and a dispersing means located in the middle of the flood cell. A slurry feed means is located just above the dispersing means and operates to feed slurry and water to the dispersing means. The dispersing mechanism comprises a plurality of rotatable blades mounted in the vertical plane on a hub which is rotatable by either mechanical drive means or by water driven turbine means. Mounted adjacent the rotatable blades is a plurality of vertical fixed blades which act together with the rotatable blades to induce a shearing action in the slurry mixture, thereby breaking up conglomerates, aerating the slurry so that intimate contact between air and bitumen droplets occurs and causes the bitumen to rise within the separation vessel while sand settles to the bottom.

---

This invention is related to an apparatus for the mechanical separation of hydrocarbon material as a froth from a mixture of water and sand. More particularly this invention is directed to an apparatus for efficiently and continuously separating a hydrocarbon material such as bitumen from an aqueous slurry of tar sand.

The economic extraction of hydrocarbon products from either tar sand or shale oil is regarded as of the utmost commercial significance. Both tar sand and shale oil represent sources of petroleum products in substantial quantities which due to their location in North America insures a sizeable domestic reserve for future use.

United States oil shale represents 650 billions of barrels of synthetic hydrocarbons while Canadian tar sands represent another 300 billion barrels of synthetic petroleum according to present estimates. One of the most extensive deposits of tar sand occurs for instance in the Athabasca District of the province of Alberta, Canada where it extends for many thousands of square miles and in thicknesses ranging up to more than 200 feet.

The important factor in the economic production of synthetic crude from such resources is the necessity of an economical and effective process for the separation of the hydrocarbon component in tar sands generally known as bitumen. Various methods have been proposed for separating bitumen from bituminous sand. Besides those processes which contemplate "in situ" retorting the two best known methods are often referred to respectively as the "hot water method" and the "cold water method." In the former the bituminous sand is slurried with steam or hot water at about 180° F. and the pulp is then dropped into a turbulent stream of circulated water and carried through a separation vessel maintained at an elevated temperature of about 175° F., so that the oil rises to the top as a froth rich in bitumen. The so called "cold water method" does not involve heating the bituminous sand other than whatever heating might be required to conduct the operation at a temperature of from about 73° F. to 81° F. The latter process additionally comprises mixing bituminous sand with water, soda ash in an organic solvent such as kerosene, and then permitting the mixture to separate at a temperature within about 73° F. to 81° F. Subsequently the bitumen dissolved in the organic solvent rises to the top of settling zone and is recovered.

Many forms of separation apparatus have been either developed or proposed for effectively utilizing the hot water process in an economical manner in order to effectively separate at low cost the bituminous hydrocarbon material from the tar sands. As yet no completely satisfactory process and apparatus have been developed although several are either being tested or as in the case of several of the present operations are being used.

I have therefore invented a controlled phase separation vessel with a view to providing a superior and more efficient apparatus for extracting bitumen from a slurry of water and tar sand. The separation vessel briefly comprises a vertically mounted elongated shell, an open ended cylinder coaxially mounted within the shell at about its midpoint and spaced apart from the shell to form an annular shaped passage around the mixing zone, dispersing means, preferably a plurality of rotatable vertical blades adjacent a plurality of fixed blades, and a feed means for passing a slurry of water and tar sand into the mixing zone where the dispersion mechanism by shearing action breaks up the tar sand mixture into a multiplicity of small bitumen particles which rise upwardly in the vessel to form a froth.

It is therefore an object of this invention to provide an apparatus for separating a mixture of water, sand, and a hydrocarbon material.

It is another object of this invention to provide an apparatus for efficiently separating bitumen from a slurry of water and tar sand.

Still another object of this invention is to provide an apparatus for separating bitumen and sand in a continuous operation.

Other objects and advantages of this invention will be apparent to those skilled in the art from the description of the drawings and embodiments which follow.

In order to more fully describe the apparatus, drawings of the preferred embodiment are provided, a brief description of which is as follows:

FIGURE 1 is a cutaway view of the separation vessel; and

FIGURE 2 is an isometric view showing the mixing zone of the vessel.

Referring to the drawings wherein the same reference number is used to denote similar components of the apparatus, a separation vessel 12 is shown in schematic form in FIGURE 1 of the drawings. The separation vessel is a vertical column shaped shell 14 which is divided functionally into at least three zones, specifically: a mixing zone 16 located about midway in the vessel; a froth disengaging zone 18 located above the mixing zone in the top portion of the vessel; and a sand settling zone 20 located in the bottom portion of the vessel.

In the mixing zone 16, the slurry is subjected to shear by a dispersion mechanism 21 in order to to achieve good separation of the oil-water-sand mixture in the slurry and break up any clusters or agglomerates. Any clusters or agglomerates in the slurry can either reduce quality of the froth or effective recovery of bitumen. The quality of the froth largely depends on the amount of shear introduced in the slurry during dispersion. Thus the mixing zone 16 comprises an open ended cylindrically shaped flood cell 22 mounted coaxially in the shell 14 at the midpoint thereof and at a spaced distance from the shell wall thereby forming an annular passage 23. The mechanism 21 is centrally located within the flood cell 22. Across each open end of the cell are located turbulence reducing baffles, upper turbulence reducing baffles 24 at the upper end of the flood cell and similar lower turbulence reducing baffles 26 at the bottom end of the flood cell. The turbulence reducing baffles reduce fluid turbulence by inducing linear flow through each open end of the flood cell. Preferably the two sets of turbulence reducing baffles 24 and 26 are constructed of a plurality of vertical plates 28 mounted at parallel spaced intervals to each other and interconnected with a similar plurality of vertical plates 30 mounted in the vertical plane parallel to each other and at right angles to the first plurality of plates 28. Such baffles are generally referred to as straightening vanes, and it should therefore be understood that the specifically described boxlike baffle structure is merely one of several structural arrangements capable of performing the function of turbulence reducing. A sample of similarly functional baffles are honeycomb or hexagonally shaped baffles and those with a tubular cross-section or octagonal cross-section.

Mounted centrally in the flood cell 22 is a means for feeding wash water and water-tar sand slurry into the mixing zone. This is preferably accomplished by a centrally mounted vertical feed conduit 32 passing through the vessel 12 at its top 34 and extending coaxially downward in the vessel 12 to a point midway in the flood cell 22 and having a feed port 36 located above the dispersion mechanism 21. Communicatingly attached to the feed conduit 32 is a flood water feed pipe 38 which passes through the sides of the vessel 12 and the flood cell 22 and is communicatingly connected to the feed conduit 32 above the food port 36.

The dispersion mechanism 21 is mounted in the flood cell below the feed port 36 and acts to impart a washing and shearing action to the aqueous slurry of tar sand impinging upon the dispersion mechanism 21. The dispersion mechanism is either a conventional mixer not shown, or preferably a mechanism having a plurality of rotatable blades 40 vertically mounted on an impeller 42, which is rotatably mounted on a vertical shaft 44 and serves to direct the downwardly flowing slurry outwardly in a radial direction. The shaft 44 is rotatably mounted in a journal 46 and is rotated by means of mechanical drive, not shown through a right angle transmission 48 which is securely mounted to the walls of the shell 14 after passing through the flood cell 22. Alternatively the impeller 42 may be rotated by a water turbine drive or equivalent means and thereby dispense with the need for a mechanical transmission assembly for the rotating drive.

Fixedly mounted to the inside wall of the flood cell are a multiplicity of static blades 50 located in the vertical plane adjacent to and surrounding the plurality of rotatable blades 40.

In operation an aqueous slurry of tar sand is passed into the vessel 12 through the slurry feed conduit 32, and is mixed with flood water if necessary (supplied through water feed pipe 38 from a source not shown). The slurry is passed into the flood cell via the feed port 36 and passes downwardly over the rotating impeller 42 which imparts outward radial flow to the slurry, directing the slurry into the path of the rotating blades 40 and subjecting the slurry to a shearing action between the rotating and the static blades. It is believed that the slurry after being subjected to shear is in a well dispersed state, that is, any agglomerates or clusters of bitumen and sand are broken up. The bitumen and sand are therefore disengaged, and the bitumen particles are attached to small air bubbles. No severe vertical flow patterns however are set up in the flood cell either to carry the heavier sand upwardly or to carry lighter aerated bitumen particles downwardly. The water generally flows away from the dispersion mechanism in either vertical direction and out of the flood cell 22 through the open ends. A major portion of the sand, being heavier than water settles downwardly in the flood cell and passes out the bottom end of the flood cell through the lower turbulence reducing baffles 26. The aerated bitumen particles being slightly lighter than the water tend to move upwardly with that portion of the water passing out through the upper turbulence reducing baffles 24 and out of the flood cell.

A sand settling zone 20 is located in the vessel 12 below the lower turbulence reducing baffles 26. Internally mounted at the lower end of the sand settling zone is a frusto-conical open ended deflector 58. A second cone shaped deflector 60 is mounted above the open ended deflector 58 in spaced relationship thereto. The two deflectors function in concert to cause the sand-water mixture to change direction radially outwardly thereby causing the sand to move outwardly while the water again changes direction at the bottom of the open ended deflector 58 and passes upwardly inside the open ended deflector and out through the space between the two deflectors.

A middlings removal conduit 62 passes through the outside wall of the separation vessel 12 at an angle so as to slope downwardly into the sand settling zone 20, where the conduit 62 also passes through the wall of the open ended deflector 58 and terminates as a middlings withdrawal port 64 located within the space enclosed by open ended deflector 58. A portion of the water reverses flow in the sand settling zone and flows upwardly within the open ended deflector 58 being withdrawn via the middlings withdrawal port 64 and conduit 62. The upwardly flowing water within the open ended deflector 58 is likely to contain some bitumen particles which are withdrawn together with the water in the middlings stream.

A teeter zone 66 is located below the sand settling zone 20 at the bottom of the separation vessel 12. The teeter zone 66 is formed of an inverted frusto-conical walled cylinder 68 with an upper radial mounting flange 74 which is fixedly attached to the bottom of the shell 14.

Cone valve 76 which is slightly larger than the lower opening 78 of the teeter zone 66 is movably mounted at the opening 78 and can be vertically moved to either close the lower opening 78 or provide an opening of variable cross sectional area. Means for moving the cone valve 76 comprises a flexible cable 80 having an end fixedly attached to the apex of the cone valve 76. The cable 80 is slidably mounted in a sleeve 84 which in turn is fixedly attached by a pair of support rods 86 to the bottom of the open ended deflector 58. The flexible cable 80 after passing through the vessel wall via an adaptor 88 (which permits sliding movement while sealing vessel 12) is attached at its upper end to a clevis joint 90. The clevis joint 90 is pivotly connected to the lower end of a lever arm 92 which is attached by a pin 94 at the fulcrum of the lever arm 92 to one end of a pivot support 96. The other end of the pivot support 96 is attached to the outside of the separation vessel 12. Manual movement of the lever arm 92 will move the cone valve 76 into the desired position either to close the teeter zone opening 78 thereby causing sand to accumulate in the bottom of the teeter zone while the water and middlings continually pass out the middlings withdrawal conduit 62 or to open the zone to dump sand.

Extending above the mixing zone 16 and forming part of the separation vessel is a quiet zone 98. A streamliner 104 is fixedly mounted to the internal wall of the shell 14 and is constructed of a plurality of vertical box-like baffles similar to the turbulence reducing baffles 24 and 26 mounted in the flood cell 22. These act to streamline the upward flow of water and bitumen particles, reduce turbulence and aid in disengaging any sand carried by the upwardly flowing water.

A recycle conduit 106 communicatingly connected to the shell 14 provides means for drawing off water from the shell 14 above the flood cell 22 and recycling the same via a pump 107 to a point in the shell below the flood cell. A portion of the water stream below the flood cell 22 passes upwardly via the annular passage 23 and tends to carry the lighter bitumen particles upwardly past the flood cell. The annular passage 23 therefore acts as a bypass, allowing a portion of the fluid stream below the flood cell to carry bitumen particles upwardly towards the froth disengaging zone 18.

A set of turbulence reducing baffles 108 of similar design to the box-like streamliner 104 is mounted in the upper portion of the quiet zone 98 as shown. Below these turbulence reducing baffles 108 is a set of heating coils 110 which act to heat the upwardly flowing stream if desired. The coils 110 may be of any suitable configuration and may be heated either by hot water, steam or any hot fluid passing therethrough or if desired even by an electrical heating element.

The froth disengaging zone 18 is located above the quiet zone 98 and is formed of a tubular extension 112 having a somewhat smaller diameter than the shell 14. A connecting flange 114 at the bottom of the tubular extension 112 is utilized for attachment of the disengaging zone to the shell 14. A slightly conical shaped end plate 116 is attached to the top of the tubular extension 112 and forms the top 34 of the separation vessel 12 and has three openings therethrough. Froth withdrawal means is provided and takes the form of a horizontal froth removal conduit 118 which is attached to one of the openings in the end plate 116 and forms together with the opening a froth removal port 120. A second axially located sealed opening has the slurry feed conduit 32 passing therethrough. The third opening in the end plate 116 has a smaller diameter water underwash feed pipe 122 passing therethrough.

The underwash feed pipe 122 extends downwardly to the bottom of the froth disengaging zone 18 where it is communicatingly connected to a transversely mounted circular underwash sparger 124 having a multiplicity of holes 126 through which underwash feed water is passed into the bottom of the froth disengaging zone 18.

Mounted above the underwash sparger 124 is another set of turbulence reducing baffles 128 of similar design to the baffles described above which serve to reduce turbulence below the froth-water interface 130. The froth-water interface is established and maintained in operation at a level just below the froth withdrawal port 120.

In operation the slurry of water, bitumen and sand is fed through the slurry feed conduit 32 to the mixing zone 16 just above the dispersion mechanism 21 and mixed if necessary with water added from the flood water feed pipe 38. The dispersing means 21 which is preferably of the type described herein, serves to disperse and shear the slurry, aerate the bitumen particles and separate the sand and bitumen particles. A major portion of the bitumen particles being lighter than water tend to rise out of the flood cell 22 together with the upwardly flowing portion of the water and pass through the upper turbulence reducing baffles 24 at the upper end of the flood cell 22, then through the quiet zone streamliner 104 upwardly past the heating coils 110, and past the underwash sparger 124 to the top level of the water where the bitumen forms a froth floating on top of the water. Froth is continually removed through the froth removal conduit 118 and passed for subsequent treatment such as dewatering to obtain a synthetic hydrocarbon petroleum oil.

I claim:

1. A vessel for separating a mixture of water, hydrocarbon material and solids comprising:
    a vertically mounted elongated cylindrical shell;
    an open ended cylindrical flood cell coaxially mounted within said shell and spaced apart from the inside of said shell to form an annular passage between the shell and the cylindrical flood cell;
    feed means opening into said flood cell for feeding the mixture of water, hydrocarbon material and solids into said cell;
    a plurality of vertically mounted rotatable blades rotatably mounted about a vertical axis in the flood cell below and adjacent to the feed means;
    means for rotating said rotatable blades; and
    a plurality of vertically mounted static blades fixedly mounted in said flood cell adjacent said rotatable blades at the radial periphery thereof, whereby the rotating blades and the static blades in combination impart a high shear dispersing action to the mixture.

2. The separation vessel of claim 1 which also includes a multiplicity of vertical baffles mounted in the open ends of said flood cell, said baffles acting as turbulence reducers.

3. The separation vessel of claim 1, said vessel additionally comprising:
    a froth disengaging means for disengaging froth from the mixture and withdrawing the froth from the vessel, said froth disengaging means being located within said vessel above said cylindrical flood cell and separated from said flood cell by means for reducing turbulence; and
    particulate solids settling means located within said vessel below said flood cell.

4. The separation vessel of claim 1, which also includes means for withdrawing water from said shell at a point above said flood cell and recycling same to a point in said shell below said flood cell.

5. The apparatus of claim 3 wherein said froth disengaging means comprises:
    a froth removal conduit communicatingly connected to the vessel at the top of the shell; and
    a multiplicity of vertical baffles fixedly mounted within said shell below and in spaced relation to said froth removal conduit.

6. The apparatus of claim 3 wherein said particulate solids settling means comprises:
    a frusto-conical open ended deflector mounted in the bottom end of said vessel below said flood cell; and
    a second cone shaped deflector mounted above said open ended deflector in spaced relation thereto, whereby the two deflectors function in concert to cause the mixture of sand and water flowing over the cones to separate from each other.

7. The apparatus of claim 5 which additionally comprises a middlings removal conduit passing through said elongated shell and opening into the space enclosed by said open ended deflector, an inverted frusto-conical walled cylinder attached to the bottom of said vessel shell and forming an opening in the bottom of the vessel for dumping solids, and valve means mounted adjacent said opening for opening and closing said opening.

8. The apparatus of claim 7 wherein said valve means comprises a cone valve movably mounted above said opening, and means for moving said cone valve into said opening to close said opening and out of said opening to provide a variable opening.

References Cited

UNITED STATES PATENTS

| | | | |
|---|---|---|---|
| 2,047,643 | 7/1936 | Mayer | 261—93 X |
| 2,304,270 | 12/1942 | Mead | 209—169 |
| 2,628,827 | 2/1953 | Daman | 209—169 X |
| 3,307,697 | 3/1967 | Fahlstrom | 209—169 |
| 3,339,730 | 9/1967 | Boutin | 209—166 |

FOREIGN PATENTS 42,370   12/1916   Sweden.

HARRY B. THORNTON, Primary Examiner

ROBERT HALPER, Assistant Examiner

U.S. Cl. X.R.

209—169; 261—93